United States Patent
Vujasinovic et al.

(10) Patent No.: US 8,538,638 B2
(45) Date of Patent: Sep. 17, 2013

(54) METHOD AND DEVICE FOR CONTROLLING A VEHICLE MOVEMENT CAPABILITY AND/OR A CLOSURE DEVICE

(75) Inventors: Mirko Vujasinovic, Wolfsburg (DE); Torsten Zawade, Peine (DE)

(73) Assignee: Volkswagen AG, Wolfsburg (DE)

(*) Notice: Subject to any disclaimer, the term of this patent is extended or adjusted under 35 U.S.C. 154(b) by 83 days.

(21) Appl. No.: 13/203,214

(22) PCT Filed: Feb. 23, 2010

(86) PCT No.: PCT/EP2010/001216
§ 371 (c)(1),
(2), (4) Date: Nov. 2, 2011

(87) PCT Pub. No.: WO2010/099904
PCT Pub. Date: Sep. 10, 2010

(65) Prior Publication Data
US 2012/0041647 A1 Feb. 16, 2012

(30) Foreign Application Priority Data
Mar. 3, 2009 (DE) .......................... 10 2009 011 088

(51) Int. Cl.
*B60K 28/10* (2006.01)
(52) U.S. Cl.
USPC ................................................ 701/49; 701/1
(58) Field of Classification Search
USPC ........ 701/22, 36, 1, 49; 191/2; 340/5.3–5.31
See application file for complete search history.

(56) References Cited

U.S. PATENT DOCUMENTS

| | | | |
|---|---|---|---|
| 4,878,050 A * | 10/1989 | Kelley | 340/12.54 |
| 6,011,484 A | 1/2000 | Dietl et al. | |
| 6,400,042 B1 * | 6/2002 | Winner et al. | 307/10.5 |
| 7,253,721 B2 | 8/2007 | Flohr et al. | |
| 7,313,469 B2 | 12/2007 | Wobben | |
| 2003/0062210 A1 | 4/2003 | Farmer | |
| 2005/0212665 A1 | 9/2005 | Flohr et al. | |

(Continued)

FOREIGN PATENT DOCUMENTS

| DE | 8213270 U1 | 8/1982 |
|---|---|---|
| DE | 8213269 U1 | 11/1982 |

(Continued)

OTHER PUBLICATIONS

International Preliminary Report on Patentability; International Patent Application No. PCT/EP2010/001216; Sep. 6, 2011.

(Continued)

*Primary Examiner* — Yonel Beaulieu
(74) *Attorney, Agent, or Firm* — Barnes & Thornburg LLP

(57) ABSTRACT

A method and a device (1) for controlling a vehicle movement capability and/or a closure device (2), which closes at least one vehicle interface for receiving external feed equipment. It is possible for external feed equipment to be received only when a closure device is open. The vehicle movement capability knows at least the states 'admissible' and 'inadmissible', and the closure device (2) knows at least the states 'locked without unlocking enabled (VOF)' and 'locked with unlocking enabled (VMF)'. The state of the closure device can be changed depending on at least one state of the vehicle movement capability and/or the state of the vehicle movement capability depending on at least one state of the closure device (2).

12 Claims, 2 Drawing Sheets

(56) References Cited

U.S. PATENT DOCUMENTS

| | | |
|---|---|---|
| 2006/0100754 A1 | 5/2006 | Wobben |
| 2008/0118797 A1 | 5/2008 | Hirakata |
| 2009/0082916 A1 | 3/2009 | Tanaka |

FOREIGN PATENT DOCUMENTS

| | | |
|---|---|---|
| DE | 9211114 U1 | 10/1992 |
| DE | 4202075 A1 | 7/1993 |
| DE | 10224807 A1 | 1/2004 |
| DE | 202004014639 U1 | 12/2004 |
| DE | 102004014497 A1 | 11/2005 |
| DE | 102007002025 A1 | 7/2008 |
| DE | 102008048310 A1 | 4/2009 |
| EP | 0808980 A2 | 11/1997 |
| EP | 1995109 A1 | 11/2008 |
| JP | 2005067545 A | 3/2005 |
| KR | 2019990016424 | 5/1999 |
| KR | 1020070080420 | 8/2007 |

OTHER PUBLICATIONS

Search Report and Written Opinion for International Patent Application No. PCT/EP2010/001216; Sep. 10, 2010.

\* cited by examiner

METHOD AND DEVICE FOR CONTROLLING A VEHICLE MOVEMENT CAPABILITY AND/OR A CLOSURE DEVICE

PRIORITY CLAIM

This patent application is a U.S. National Phase of International Patent Application No. PCT/EP2010/001216, filed 23 Feb. 2010, which claims priority to German Patent Application No. 10 2009 011 088.7, filed Mar. 3, 2009, the disclosures of which are incorporated herein by reference in their entirety.

FIELD

Disclosed embodiments related to a method and to a device for controlling a vehicle movement capability and/or a closure device.

BACKGROUND

The feeding of external feed devices into vehicles, for example of a charging cable into an electric vehicle or hybrid vehicle, is usually done via vehicle interfaces, for example charging sockets, which provide a receiving device for the feed devices. The vehicle interfaces are usually protected by a closure device, for example a charging socket cover so that in the closed state of the closure device it is not possible to receive the external feed device.

The charging of the battery of electric vehicles or hybrid vehicles is usually carried out by feeding in a charging cable into a charging socket, wherein the charging socket cover has to be opened. When charging the electric vehicle or hybrid vehicle by feeding a charging cable into a charging socket there in generally the risk that movements of the vehicle when the charging cable is fed in can lead to damage to the vehicle and/or to the charging device. This is the case, in particular, if the vehicle can still move, in particular roll away, during the charging, or if it has been neglected to remove the charging cable before driving away.

DE 42 02 075 A1 discloses a device which, in order to prevent a vehicle from driving away without a filling nozzle being returned to a gas pump and in order to avoid damage resulting from this, provides a locking device on the gas pump which can be activated with the ignition key of the motor vehicle and which prevents the refueling process in the locked state and locks the ignition key in the unlocked state.

DE 92 11 114 U1 discloses an external car lock which has the function of being moved out under vehicles in order to prevent them from driving away by virtue of the fact that the vehicle is held in a non-damaging fashion until the amount for the refueling is paid and the gas tank attendant or cashier releases the vehicle without delay.

SUMMARY

The disclosed embodiments are, therefore, based on the technical problem of providing a method for controlling a vehicle movement capability and/or a closure device, in particular a charging socket cover, as well as a device which is suitable for this purpose, by means of which damage to the vehicle and/or to the feed device, which could arise due to movement of the vehicle during the feeding, are avoided.

BRIEF DESCRIPTION OF THE DRAWINGS

The disclosed embodiments will be explained in more detail below with reference to one exemplary embodiment. In the figures.

DETAILED DESCRIPTION

Figure 1:
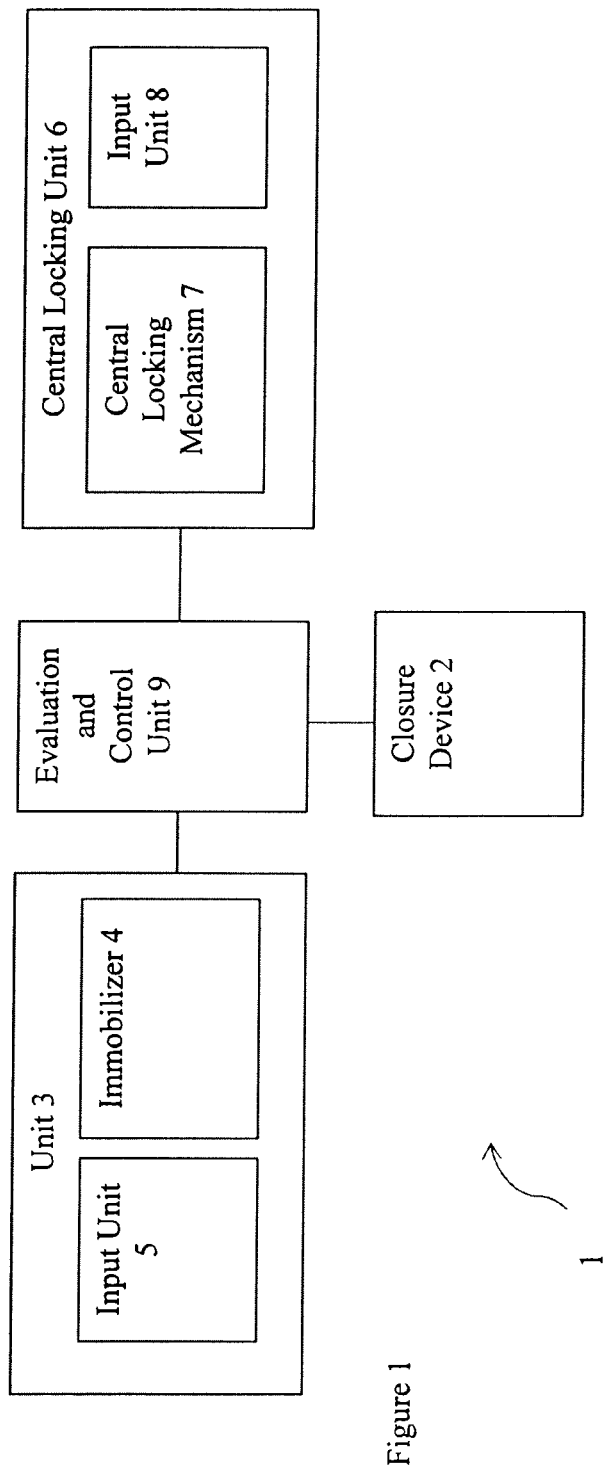
FIG. 1 is a schematic block circuit diagram of a device for controlling a vehicle movement capability and/or a closure device.

A vehicle movement capability and/or a closure device which closes at least one vehicle interface for receiving external feed devices are controlled here, wherein external feed devices can be received only when a closure device is open, wherein the vehicle movement capability has at least the states of admissible and inadmissible, in which the closure device has at least the states of locked without unlocking enabled (VOF) and locked with unlocking enabled (VMF), wherein the state of the closure device can be changed as a function of at least one state of the vehicle movement capability, and/or the state of the vehicle movement capability can be changed as a function of at least one state of the closure device. It is therefore advantageously ensured that, for example, the closure device can be unlocked only if the movement capability of the vehicle is inadmissible. It is therefore ensured that the feed device can be introduced only when the vehicle can no longer move. Alternatively or cumulatively there is provision that a movement capability of the vehicle is permitted only when the closure device is locked. This prevents the vehicle beginning to move when the feed device is not yet removed. For example, the vehicle interface for receiving external feed devices is an interface for receiving working materials, for example fuel and/or cooling water, and/or for receiving data, for example vehicle status data. Furthermore, an external feed device comprises devices which are suitable for feeding in working materials and/or data. In particular, the vehicle interface in the case of an electric vehicle or hybrid vehicle can constitute a charging socket for feeding in electrical power, wherein the feeding device in this case is embodied, for example, as a charging cable with a charging plug.

For example, the closure device is implemented by means of a charging socket cover which has a lock mechanism and which can be opened or closed as a function of the state of the lock (locked or unlocked).

The vehicle movement capability and/or the closure device are controlled here, for example, by means of an evaluation and control unit which is, for example, a central evaluation and control unit or which is, for example, an integral component of a unit for controlling the vehicle movement. Alternatively, the control logic is distributed between at least two control and evaluation units, for example as an integral component of the closure device and of the unit for controlling the vehicle movement capability.

In one embodiment, the admissible state of the vehicle movement capability is implemented by deactivation of an immobilizer and/or by activation of a drive train, and the inadmissible state of the vehicle movement capability is implemented by activation of an immobilizer and/or by deactivation of the drive train. An advantage of this embodiment is the implementation of the states of the vehicle movement capability by means of functions which are generally already present in a vehicle, so that no additional elements have to be introduced for controlling the states of the vehicle movement capability.

In a further embodiment, the immobilizer is activated by activation of a parking brake and/or by adjustment of a selector lever position, which has at least the states of parked and not parked, to the state of parked, and the immobilizer is deactivated by deactivation of a parking brake and/or by adjustment of the selector lever position to the state of not parked. In particular, the parking brake is embodied as an electric parking brake. Furthermore, selector lever position in an interface for operating the vehicle, by means of which a desired state of the vehicle, for example parking, can be selected. In this embodiment, the control of the immobilizer by means of functions which are generally already present in a vehicle, with the result that no additional elements have to be introduced for activating or deactivating the immobilizer, is advantageous.

In a further embodiment, if the vehicle movement capability is adjusted to the inadmissible state, the closure device is adjusted to the state of locked with unlocking enabled (VMF). This advantageously permits the closure device to be unlocked only if a vehicle movement is inadmissible (no longer admissible). If the closure device is locked in an initial state, it can be unlocked only if the vehicle can no longer move.

In a further embodiment, if the vehicle movement capability is adjusted to the admissible state, the closure device is adjusted to the state of locked without unlocking enabled (VOF). This ensures that when a vehicle movement is possible or is to be implemented, the closure device is locked and cannot be unlocked.

In a further embodiment, the closure device also has the state of unlocked with locking enabled (EMF), wherein the closure device can only be adjusted from the state of locked with unlocking enabled (VMF) to the state of unlocked with locking enabled (EMF). This advantageously ensures that the closure device can be unlocked only from a state in which no vehicle movement capability is admissible. This also ensures that locking is admissible from this state.

In a further embodiment, if the closure device assumes the state of locked with unlocking enabled (VMF), the adjustment of the closure device to the state of unlocked with locking enabled (EMF) is carried out by means of a signal for unlocking the closure device, wherein the signal for unlocking the closure device is generated by operating an unlocking signal generator or by an unlocking signal from a central locking unit of the vehicle. This advantageously ensures that unlocking of the closure device from a state which is admissible for this takes place in response to an explicit signal, for example pressing of a pushbutton key by the operator of the vehicle, or is combined with the function of a central locking system which is usually present. It is possible to provide in this context that, if both methods of generating the signal for unlocking the closure device are possible, the selection of the unlocking signal can be programmed on a user-specific basis.

In a further embodiment, if the closure device assumes the state of unlocked with locking enabled (EMF) and the vehicle movement capability is adjusted to the admissible state, the closure device is adjusted to the state of locked without unlocking enabled (VOF). This advantageously ensures that in the case of an admissible vehicle movement capability the closure device is locked and cannot be unlocked.

In a further embodiment, if the closure device assumes the state of unlocked with locking enabled (EMF), the closure device is adjusted to the state of locked with unlocking enabled (VMF) by means of a signal for locking the closure device, wherein the signal for locking the closure device is generated by the operation of a locking signal generator or by a signal from the central locking unit of the vehicle, wherein the signal for locking the closure device can also be generated by the central locking unit after a delay of a defined time interval. In this way it is possible to ensure that after activation of the central locking system the operator of the vehicle can still open the closure device within the defined time interval. It is therefore possible to feed in an external feed device, for example a charging cable, even when the passenger compartment of the vehicle is closed.

In one embodiment, the closure device also has the state of unlocked without locking enabled (EOF), wherein the closure device can only be adjusted from the state of unlocked with locking enabled (EMF) to the state of unlocked without locking enabled (EOF), and wherein, if the closure device assumes the state of unlocked without locking enabled (EOF), the adjustment of the vehicle movement capability to the admissible state is not possible.

In a further embodiment, if the closure device assumes the state of unlocked with locking enabled (EMF), adjustment of the closure device to the state of unlocked without locking enabled (EOF) is carried out by opening the closure device, wherein the opening of the closure device is sensed and communicated by means of a closure device sensor which detects at least the open state. This advantageously ensures that when the closure device is opened, as a result of which it is not possible to lock the closure device, no movement of the vehicle is admissible either.

In a further embodiment, if the closure device assumes the state of unlocked without locking enabled (EOF), adjustment of the closure device to the state of unlocked with locking enabled (EMF) is carried out by closing the closure device, wherein the closing of the closure device is sensed and communicated by means of a closure device sensor which detects at least the open state. This advantageously ensures that a movement of the vehicle or locking of the closure device is possible only if the closure device is closed.

In order to control a vehicle movement capability and/or a closure device which closes at least one vehicle interface for receiving external feed devices, wherein external feed devices can be received only when the closure device is open, wherein the vehicle movement capability has at least the states of admissible and inadmissible, in which the closure device has at least the states of locked without unlocking enabled (VOF) and locked with unlocking enabled (VMF), wherein the state of the closure device can be changed as a function of at least one state of the vehicle movement capability, and/or the state of the vehicle movement capability can be changed as a function of at least one state of the closure device, a device comprises at least one controllable closure device which operates at least one lock mechanism of a closure, and at least one unit for controlling the vehicle movement capability, wherein the closure device and the unit for controlling the vehicle movement capability are connected by data technology.

With respect to further advantageous refinements of the device, reference is made to the preceding statements relating to the control method.

FIG. 1 illustrates a block circuit diagram of a device 1 for controlling a vehicle movement capability and a closure device 2. The device 1 has a closure device 2 which closes a vehicle interface (not illustrated) for receiving external feed devices, wherein external feed devices can be received only when a closure device 2 is open. In particular, the closure device 2 is equipped with a lock mechanism which permits locking and unlocking of the closure device. For example, the closure device 2 is a charging socket cover which closes a charging socket of an electric vehicle or hybrid vehicle, with the result that in the closed state of the charging socket cover a charging cable cannot be fed in. The lock mechanism comprises, for example, metal pins which can be moved in and out from the charging socket cover into sockets provided for this purpose in the vehicle bodywork using a controllable actuator system, wherein the metal pins lock the charging socket in the inserted state, and unlock it in the moved-out state.

The device also comprises a unit 3 for controlling the vehicle movement capability, which unit 3 comprises an immobilizer 4 and an input unit 5, wherein the immobilizer 4 is embodied, for example, as an electric parking brake. Alternatively or cumulatively, the immobilizer 4 is embodied as an interruption in a drive train. The input unit 5 for the immobilizer 4 is embodied, for example, as a lever or as a pushbutton key. Furthermore, the device 1 for controlling a vehicle movement capability and/or a closure device 2 comprises a central locking unit 6 which contains a central locking mechanism 7 and an input unit 8 for the central locking mechanism 7. The input unit 8 is implemented, for example, by sensor-assisted vehicle door locks and/or radio control of the vehicle door locks.

Furthermore, the device 1 comprises a central control and evaluation unit 9 which receives and evaluates information from the closure device 2, the unit 3 for controlling the vehicle movement capability and the central locking unit 6, and controls the states of the closure device 2 and of the unit 3 for controlling the vehicle movement capability. For example, the central evaluation and control unit 9 can be integrated into at least one existing vehicle control unit or an existing control device. The control and evaluation unit 9, the closure device 2, the unit 3 for controlling the vehicle movement capability and the central locking unit 6 are connected to one another by data technology.

Figure 2:
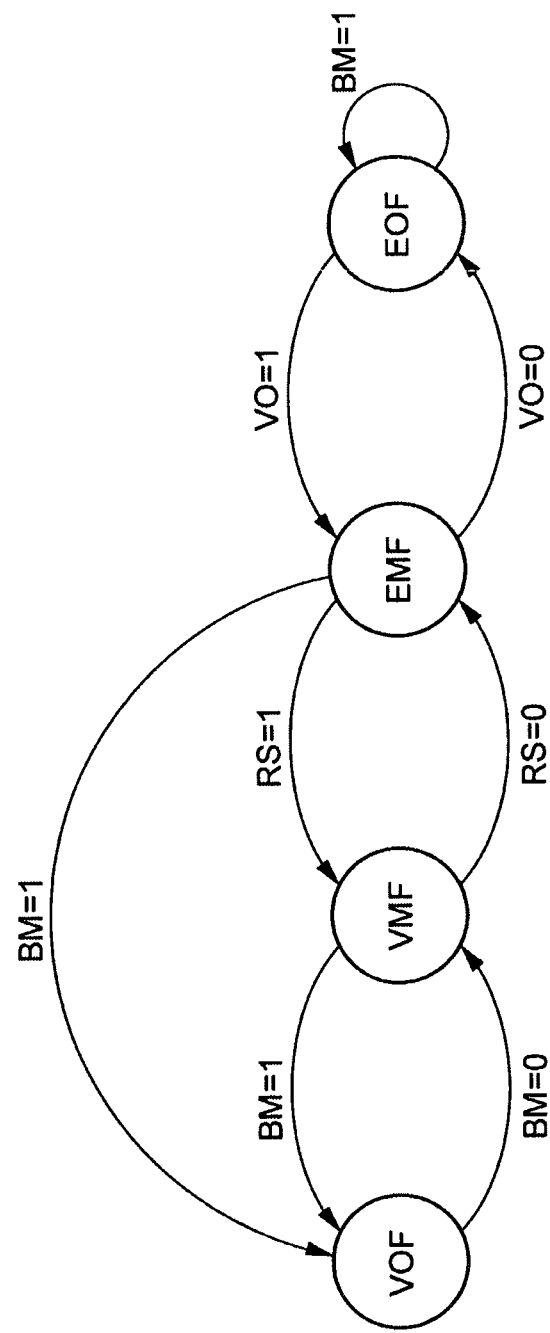
FIG. 2 is a state sequence diagram relating to the control of a vehicle movement capability and of a closure device.

FIG. 2 illustrates four states of the control of a vehicle movement capability and/or of a closure device. Here, VOF denotes the state of locked without unlocking enabled of the closure device, VMF denotes the state of locked with unlocking enabled, EMF denotes the state of unlocked with locking enabled and EOF the state of unlocked without locking enabled.

In the state of locked without unlocking enabled VOF it is not possible to unlock or open the closure device 2. In particular, the charging socket cover is closed here, the metal pins are inserted into the corresponding sockets on the bodywork of the vehicle, and a signal for unlocking the charging socket is not output. The closure device 2 changes over from the state of locked without unlocking enabled VOF to the state of locked with unlocking enabled VMF if the movement capability of the vehicle is adjusted to the inadmissible state (BM=0). This can be carried out, for example, by activating the electric parking brake.

In the state of locked with unlocking enabled VMF, it is possible to unlock the closure device 2, but it is not possible to open it. If in the state of locked with unlocking enabled VMF the movement capability of the vehicle is adjusted to the admissible state (BM=1), the closure device 2 is adjusted to the state of locked without unlocking enabled VOF. If a signal for unlocking the closure device 2 (RS=0) is output in the state of locked with unlocking enabled VMF, the closure device 2 is adjusted to the state of unlocked with locking enabled EMF. The outputting of a signal for unlocking the closure device (RS=0) can be implemented here in particular by activating a specific pushbutton key or activating a function in the vehicle operator control menu. An alternative embodiment outputs a signal for unlocking the closure device (RS=0) if the central locking mechanism 7 receives an unlocking signal via an input unit 8.

In the state of unlocked with locking enabled EMF, the opening of the closure device 2 or the locking of the closure device 2 is possible. If in the state of unlocked with locking enabled EMF, the movement capability of the vehicle is adjusted to the admissible state (BM=1) by the release of the electric parking brake, for example, the closure device 2 is adjusted to the state of locked without enabling VOF. This ensures that the closure device 2 can no longer be opened when the vehicle can be moved. If a signal for locking the closure device 2 (RS=1) is output in the state of unlocked with locking enabled EMF, the closure device 2 is adjusted to the state of locked with unlocking enabled VMF. In a way which is analogous to the unlocking process, the outputting of a signal for locking the closure device 2 (RS=1) can be implemented, in particular, by activating a specific pushbutton key or activating a function in the vehicle operator control menu. An alternative embodiment outputs a signal for locking the closure device 2 (RS=1) when the central locking mechanism 7 receives a locking signal via the input unit 8.

If the closure device 2 is opened (VO=0) in the state of unlocked with locking enabled EMF, the closure device 2 is adjusted to the state of unlocked without locking enabled EOF. In particular, in this context the charging socket cover is open and releases the charging socket. In the state of unlocked without locking enabled EOF, it is not possible to lock the closure device 2, but it is possible to close it. If in the state of unlocked without locking enabled EOF, the closure device 2 is closed, the closure device 2 is adjusted to the state of unlocked with locking enabled EMF. In the state of unlocked without locking enabled EOF it is not possible to adjust the movement capability of the vehicle to the admissible state (BM=1). When the charging socket cover is open, it is, in particular, not possible to release the electric parking brake.

The sequence and admissibility of the states therefore ensures that the charging socket cover can be opened to feed in a charging cable only in the case of a vehicle which cannot move (control of the closure device). The sequence and admissibility of the states also ensures that a vehicle can move only if the charging socket cover is closed and locked, wherein, in a closed state of the charging socket cover, no charging cable can be fed in or is fed in (control of the vehicle movement capability).

LIST OF REFERENCE SYMBOLS

VOF State of locked without unlocking enabled
VMF State of locked with unlocking enabled
EMF State of unlocked with locking enabled
EOF State of unlocked without locking enabled
1 Device
2 Closure device
3 Unit
4 Immobilizer
5 Input unit
6 Central locking unit
7 Central locking mechanism
8 Input unit
9 Evaluation and control unit

The invention claimed is:

1. A method for controlling a vehicle movement capability and a closure device which closes at least one vehicle interface for receiving external feed devices, wherein external feed devices can be received only when a closure device is open, wherein the vehicle movement capability has at least the states of permitted and prohibited, in which the closure device has at least the states of locked without unlocking enabled (VOF) and locked with unlocking enabled (VMF), wherein the state of the closure device is changed as a function of at least one state of the vehicle movement capability, and the state of the vehicle movement capability is changed as a function of at least one state of the closure device, wherein, if the vehicle movement capability is adjusted to the permitted state, the closure device is adjusted to the state of locked without unlocking enabled (VOF).

2. The method of claim 1, wherein the permitted state of the vehicle movement capability is implemented by deactivation of an immobilizer and/or by activation of a drive train, and the prohibited state of the vehicle movement capability is implemented by activation of an immobilizer and/or by deactivation of the drive train.

3. The method of claim 2, wherein the immobilizer is activated by activation of a parking brake and/or by adjustment of a selector lever position, which has at least the states of parked and not parked, to the state of parked, and the immobilizer is deactivated by deactivation of a parking brake and/or by adjustment of the selector lever position to the state of not parked.

4. The method of claim 1, wherein, if the vehicle movement capability is adjusted to the prohibited state, the closure device is adjusted to the state of locked with unlocking enabled (VMF).

5. The method of claim 1, wherein the closure device also has the state of unlocked with locking enabled (EMF), wherein the closure device is adjusted from the state of locked with unlocking enabled (VMF) to the state of unlocked with locking enabled (EMF).

6. The method of claim 5, wherein, if the closure device assumes the state of locked with unlocking enabled (VMF), the adjustment of the closure device to the state of unlocked with locking enabled (EMF) is carried out using a signal for unlocking the closure device,
   wherein the signal for unlocking the closure device is generated by operating an unlocking signal generator or by an unlocking signal from a central locking unit of the vehicle.

7. The method of claim 5, wherein, if the closure device assumes the state of unlocked with locking enabled (EMF) and the vehicle movement capability is adjusted to the admissible state, the closure device is adjusted to the state of locked without unlocking enabled (VOF).

8. The method of claim 5, wherein, if the closure device assumes the state of unlocked with locking enabled (EMF), the closure device is adjusted to the state of locked with unlocking enabled (VMF) using a signal for locking the closure device, wherein the signal for locking the closure device is generated by the operation of a locking signal generator or by a locking signal from a central locking unit of the vehicle, wherein the signal for locking the closure device can also be generated by the central locking unit after a delay of a defined time interval.

9. The method of claim 5, wherein the closure device also has the state of unlocked without locking enabled (EOF), wherein the closure device is adjusted from the state of unlocked with locking enabled (EMF) to the state of unlocked without locking enabled (EOF), and in that, if the closure device assumes the state of unlocked without locking enabled (EOF), the adjustment of the vehicle movement capability to the permitted state is not possible.

10. The method of claim 9, wherein, if the closure device assumes the state of unlocked with locking enabled (EMF), adjustment of the closure device to the state of unlocked without locking enabled (EOF) is carried out by opening the closure device, wherein the opening of the closure device is sensed and communicated using a closure device sensor which detects at least the open state.

11. The method of claim 9, wherein, if the closure device assumes the state of unlocked without locking enabled (EOF), adjustment of the closure device to the state of unlocked with locking enabled (EMF) is carried out by closing the closure device, wherein the closing of the closure device is sensed and communicated using a closure device sensor which detects at least the open state.

12. A device for controlling a vehicle movement capability and a closure device which closes at least one vehicle interface for receiving external feed devices, wherein external feed devices are received only when a closure device is open, wherein the vehicle movement capability has at least the states of permitted and prohibited, in which the closure device has at least the states of locked without unlocking enabled (VOF) and locked with unlocking enabled (VMF),
   wherein the state of the closure device is changed as a function of at least one state of the vehicle movement capability, and the state of the vehicle movement capability is changed as a function of at least one state of the closure device,
   wherein the at least one closure device operates at least one lock mechanism of a closure, and at least one unit for controlling the vehicle movement capability, and
   wherein the at least one unit for controlling the vehicle movement capability and the closure device are coupled together to exchange data.

* * * * *